June 20, 1950 J. S. COHEN 2,512,481

ANTENNA INPUT CIRCUITS

Original Filed June 25, 1947

INVENTOR.
JEFFREY S. COHEN.
BY
Alden D. Redfield.
ATTY.

Patented June 20, 1950

2,512,481

UNITED STATES PATENT OFFICE 2,512,481

ANTENNA INPUT CIRCUITS

Jeffrey S. Cohen, Los Angeles, Calif., assignor to Avco Manufacturing Corporation, Cincinnati, Ohio, a corporation of Delaware Original application June 25, 1947, Serial No. 756,992. Divided and this application July 8, 1948, Serial No. 37,579

1 Claim. (Cl. 250—20)

Figure 1:
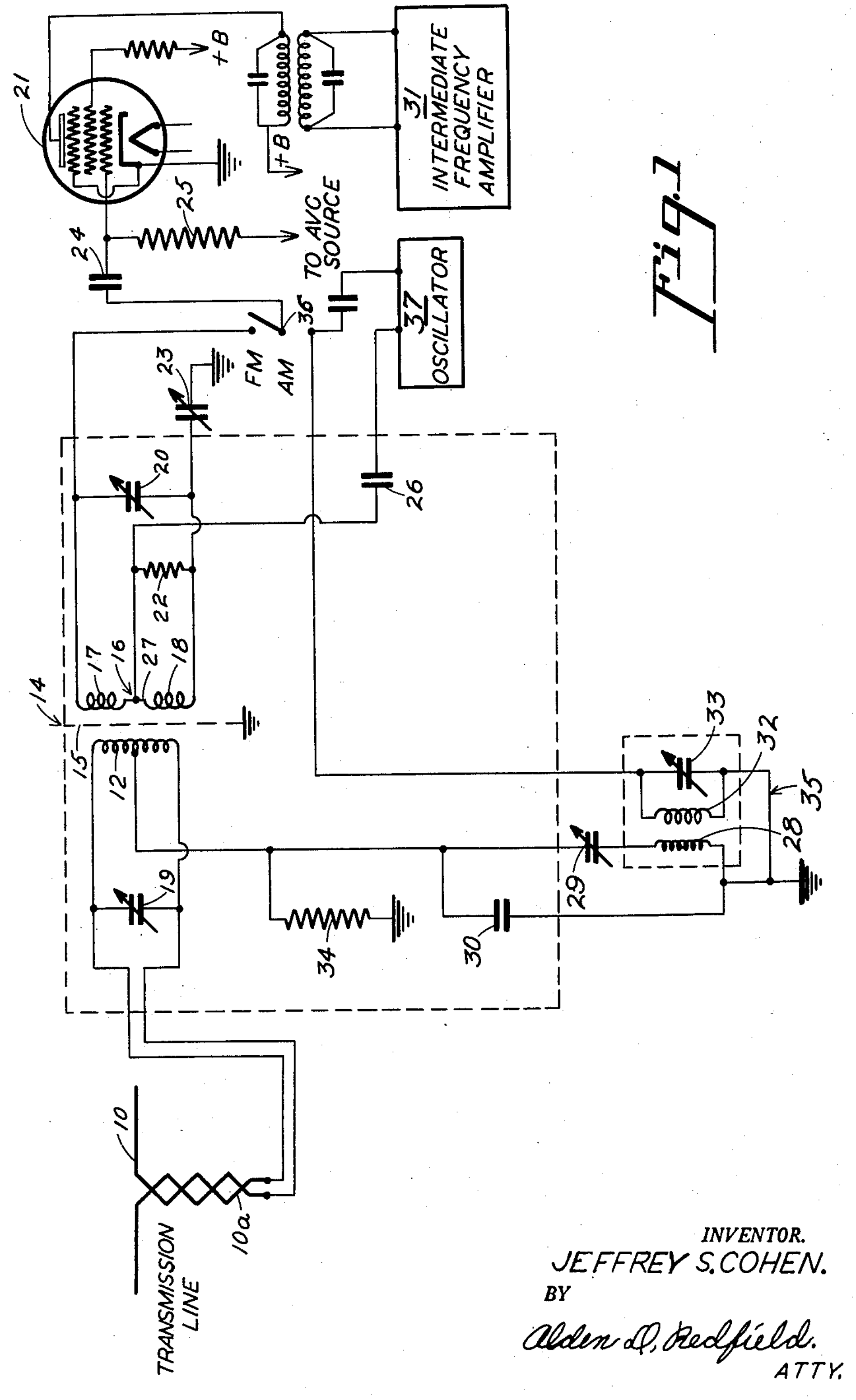

The present invention relates generally to electromagnetic wave-energy receivers, particularly to radio receiving systems and while it has a considerable range of prospective commercial applications, it is particularly useful in receivers of the type suitable for either frequency modulation (FM) or short wave (AM) signal reception.

This apparatus is a division of my co-pending patent application, Serial No. 756,992, filed in the United States Patent Office on June 25, 1947, entitled "Antenna Input Circuits" and assigned to the same assignee as the present application and invention. In that application I claim subject matter not herein claimed.

The prior art embraces such U. S. patents as Landon and Reid 2,110,159, Von Arco and Meissner 1,795,689 and Wheeler 2,092,709, which disclose a known type of antenna that is capable of operating as a flat-top or T-type for reception of signals in one band (such as AM) and as a dipole for reception of signals in another band (such as FM). In my above-mentioned application I disclose and claim an improved balanced input wherein the dipole is coupled to a balanced frequency-converting or mixer circuit.

The circuits shown in that application include a high-frequency antenna input transformer, its primary balanced to ground, and a low-frequency input transformer with its primary unbalanced to ground. The primary circuit of the low-frequency input transformer is connected between ground and a center tap on the primary of the high-frequency input transformer. In accordance with the present invention I arrange frequency-converting means to convert the high frequency signals (FM) into intermediate frequency signals having a frequency at or near the center of the band of the low-frequency signals (AM). Then I so arrange the primary circuit of the low-frequency transformer that it functions, during lower-band reception and in conjunction with its secondary as a voltage amplifier for the low frequency signals, being fixed-tuned at or near the center of the low frequency band, and during higher band reception as a rejector for the intermediate-frequency signals. The secondary of the closely coupled lower-band transformer is also tuned to a frequency at or near the center of the low-frequency band whereby the lower band transformer circuit functions as a double tuned band-pass filter having a double-humped relatively flat-topped response characteristic.

It is an object of the invention to provide, in a wave-signal translating system for signals within two distinct frequency bands, one denominated a "high-frequency band" and the other denominated a "low-frequency" band, a pair of input transformers, one being designed for balanced operation over the high-frequency band and the other being designed for unbalanced operation over the low-frequency band, a frequency converter for converting the high-frequency signals into intermediate frequency signals at approximately the center of the low-frequency band, means for resonating the primary of said low-frequency transformer at approximately the center of said low-frequency band, and means for connecting the resonant circuit formed by said primary and said resonating means between a tap on the primary of said high-frequency transformer and ground, whereby said resonant circuit performs the functions, during high frequency operation, of a wave-trap for signals of intermediate-frequency, and during low-frequency operation, of a voltage amplifier for low-frequency signals.

Another object of the present invention is to utilize the components of the tuned primary circuit of the low-frequency input transformer to perform the additional function of rejecting intermediate-frequency signals during high-frequency operation.

For a better understanding of the present invention, together with other and further objects, advantages and capabilities thereof, reference is made to the accompanying drawing, in which there is shown an input circuit arrangement for a superheterodyne receiver, including an illustrative embodiment of the present invention.

In the drawings:

Fig. 1, the sole figure, is a schematic diagram, partly in block form of the front end of a two-band (FM and AM short-wave) receiver in accordance with the invention, including a dual-purpose antenna network having a combined upper-band intermediate frequency rejector and tuned lower-band antenna input circuit in accordance with the invention. These features are shown as incorporated in a receiver adapted for frequency-modulation (FM) reception (88.1 to 107.9 mc.) or short-wave (AM) broadcast reception (9.45 to 11.9 mc.).

For the interception of electromagnetic-wave energy there is provided an antenna 10, adapted to function as a dipole during reception of frequency-modulation (FM) signals. This antenna is connected by a pair of conductors to the terminals of the primary 12 of a balanced input transformer 14. This primary is a reactance or inductance in the form of a simple coupling loop. The primary and secondary are electrostatically shielded from each other by a grounded shield 15. The secondary 16 comprises two loop or inductance portions 17 and 18, conductively joined at a center tap 27.

The primary 12 is tuned to resonance at approximately the center frequency of the FM band, 98 megacycles, by a capacitor 19 shunted across the primary, and the secondary 16 is tuned to approximately the same frequency by a capacitor 20, shunted across the secondary. Transformer 14 is over coupled so as to pass the entire 20 mc. wide FM band.

The output from transformer 14 constitutes the received FM signal input applied to the control electrode circuit of a mixer or converter tube 21.

A conventional local oscillator 37 may be employed to generate high-frequency signals which are also applied to an input circuit of the converter and therein beat against the received FM signal input to develop intermediate-frequency signals, in accordance with a heterodyne process well known to the art. Units 21 and 37 are so arranged that the I. F. signals produced during FM reception have a frequency approximately in the center of the AM band, at 10.7 megacycles, say.

One important problem solved by the invention claimed in my said co-pending application is the prevention of radiation from the antenna of signals from the local oscillator, while permitting both the received signal input and the local oscillator signals to be applied to the mixer stage without the intervention of a radio-frequency amplifier. In successfully solving this problem, the circuit of secondary 16 is arranged as a balanced bridge, one branch of which comprises an inductive reactance or winding 17, capacitor 24 and the input impedance of vacuum tube 21, and the other branch of which includes an inductive reactance or winding 18, a resistor 22 and a capacitor 23, comprising a dummy load.

Capacitor 23 is placed in circuit between ground and the junction of capacitor 20 and winding 18 in order to balance the capacitance 24 and the input capacitance of tube 21 to ground. The cathode-control grid interelectrode capacitance of tube 21 and grid capacitor 24 are serially arranged in circuit between ground and the junction of capacitor 20 and winding 17. The dummy load resistor 22 is shunted across winding 18. Windings or reactances 17 and 18 are ratio arms of the bridge. The third arm is effectively the input impedance of tube 21. The fourth arm is effectively the dummy load. Grid resistor 25 is connected between a suitable source of automatic-volume control bias (not shown) and the junction of capacitor 24 and the grid. Primary 12 and secondary 16 are magnetically coupled but capacity coupling therebetween is prevented in this illustrative embodiment by the shield 15.

The signals from local oscillator 37 are applied through coupling capacitor 26 to the center tap 27 between windings 17 and 18 or some equivalent potential point, thus being impressed between center tap and ground. Such equivalent potential point could be provided in other ways, such, for example, as by substituting two capacitors in series for capacitor 20, and by connecting the lead from condenser 26 to the junction of those capacitors. The local oscillator signals appearing in winding 17 are equal in magnitude and opposite in phase to those appearing in winding 18 and since oscillator currents in windings 17 and 18 are applied in opposition to primary 12, no currents are induced in primary 12 by the local oscillator signals. Magnetic flux interlinkages tending to induce undesired voltages by secondary action on primary 12 are canceled out. In other words, the coupling to the primary 12 is balanced out, so far as the oscillator is concerned, and radiation of the local oscillator signals from the antenna system is suppressed and prevented. This is accomplished by adjusting capacitor 23 for a voltage null across the antenna terminals, the oscillator voltages applied to ratio arms 17 and 18 then being equal and opposite in phase. Viewed in another way, the oscillator currents are 180 degrees phase-split and both portions are applied in opposition to primary 12.

In accordance with the present invention, a double-tuned band pass antenna input circuit for AM signals, novel in respects hereinafter pointed out, is provided. Specifically, a tuned primary circuit comprising winding 28 and capacitor 29 in one branch, and capacitor 30 in a parallel branch, is interposed between a center tap on primary 12 and ground. The series-resonant circuit 28, 29 effectively grounds the center tap of primary 12 for the FM intermediate frequency signals. Capacitor 30 grounds the center tap of primary 12 for radio frequency input signals during FM operation. It will be noted that the output of the mixer stage including tube 21 is coupled to an intermediate-frequency amplifier 31. The output signals of the mixer stage are of the intermediate frequency, say 10.7 megacycles, for FM operation.

It is well known to those skilled in the art that strong signals of intermediate-frequency from undesired stations may be picked up by the transmission line 10*a* connecting the dipole antenna 10 to the input transformer 14. Such signals would be amplified by tube 21 and would impair reception in the absence of a rejection circuit. Interference of this type is reduced on the FM band by arranging the primary antenna input side of the input circuit so as to present a low impedance for signals of intermediate frequency. The two sides of the transmission line 10*a* are effectively tied together at intermediate frequencies by coil 12 which represents a very low impedance at intermediate frequencies. Thus, in the Fig. 1 system, industance 28 and capacitor 29 are in series resonance at the intermediate frequency for FM operation and attentuate intermediate frequency signals picked up on the transmission lines 10*a*. The double-tuned band pass antenna input circuit is novel in the respect, among others, that its elements 28 and 29 perform this important function during FM operation. The primary circuit 28, 29, 30 of the low-band input network is tuned to the center of the AM band, i. e., to 10.7 mc., approximately half way between 9.45 and 11.9 mc. This circuit also performs another function hereinbelow described.

The FM operation of the circuits just described is next considered. The balanced half-wave dipole 10 intercepts electromagnetic wave energy and line 10*a* delivers such energy to the balanced input transformer circuit 14.

The balanced, shielded, double-tuned band pass, FM input transformer 14 amplifies the received signal voltage and rejects undesired signals outside the FM band. At the same time undesired radiation of the local oscillator signals is prevented, in accordance with the invention described in my said co-pending application. Were the last-mentioned signals not attenuated, as seen by the antenna, they would cause interference with other receivers in the vicinity. The mixer stage including tube 21 amplifies and converts the received FM signals to signals of intermediate frequency, say 10.7 megacycles.

The I. F. signal output of tube 21 is applied to the intermediate frequency amplifier 31 in any conventional manner. It will be understood that the units (not shown) in cascade with and following unit 31 may constitute the usual remaining units of a superheterodyne FM receiver: one or more I. F. stages, a discriminator, an audio amplifier, a power amplifier, and a loud speaker or transducer. It will also be understood that appropriate I. F. stages and so on are provided for AM operation, in cascade with unit 21. Such stages are not herein claimed and are well known to those skilled in the art, so they are not shown herein.

Before considering the short-wave (AM) operation of the Fig. 1 system, certain other circuit elements will be described. The double-tuned, high gain, band pass antenna input circuit transformer 35 comprises also a secondary 35, tuned by a capacitor 33 in shunt therewith. The primary 28 and secondary 32 are inductively overcoupled and so arranged that the two spaced secondary response peaks occur at 31 and 25 meters, say. The AM band covers the 31 meter and 25 meter international SW broadcast stations.

Resistor 34, between winding 12 and ground, simply functions as a static leak to bleed off antenna charges to ground.

Coming now to the AM operation of the above-described system, it will be observed that the antenna terminal of the double-tuned input transformer circuit including elements 28, 29 and 30 is connected to the center of primary 12. The dipole 10 functions during AM operation as a flat-top or T-type antenna, with both conductor portions in parallel, the impedance of primary 12 being very low at that frequency range. The intercepted wave energy is applied to the primary of input transformer 35, and voltage-amplified before application to the control electrode of tube 21. The signal currents flow through the series circuit 28, 29 rather than capacitor 30, since the series circuit presents a relatively low impedance path. Antenna 10 automatically functions as a dipole for upper band reception and as a T-type antenna for lower band reception, without requiring any mechanical antenna switch contacts.

For AM operation a double-pole double throw switch 36 is so set as to couple the secondary circuit of transformer 35 to the input circuit of tube 21. (For FM operation, the switch is so set that the secondary circuit of transformer 14 is coupled to the input circuit of tube 21.) Oscillator 37 may have two ungrounded terminals, one for FM operation and the other for AM operation. During AM operation transformer 14 and the high frequency oscillator terminals of unit 37 are in open-circuit relation to tube 21 and the switch 36 couples the lower-frequency oscillator terminals to the input of tube 21.

The following illustrative circuit parameters, also disclosed in my said co-pending application, have been found suitable in one successful embodiment of the invention:

| Element | Date |
|---|---|
| 19 | 8–95 mmf. |
| 20 | 1–12 mmf. |
| 34 | 1 megohm, ½ watt |
| 29 | 30–200 mmf. |
| 30 | 30 mmf., 500 volts, mica |
| 22 | 1000 ohms, ½ watt |
| 24 | 120 mmf., 300 volts, ceramic |
| 23 | 3–30 mmf. |
| 25 | 1 megohm, ½ watt |
| 21 | Type 6AC7 |
| FMIF | 10.7 megacycles |
| FM Band | 88–108 megacycles |
| AMIF | 5825 kilocycles from first converter |
| SW Band | 9.45 to 11.97 megacycles |
| Transformer 14 | Primary U-shaped piece #14 B & S gauge wire, ⅝″ across U, diameter of secondary loops, ¾″ dia. #14 B & S gauge, each secondary loop spaced about ½″ from either side of the primary. |
| Transformer 35 | Primary 19¾ turns #30 wire, Secondary turns #30 wire, Form diameter—½″, Winding pitch 56 turns/inch, Spacing Pri/Sec.—1 turn. |

While there has been shown and described what is at present considered the preferred form of the invention and the best mode of applying its principles, it will be obvious to those skilled in the art that various modifications and substitutions of equivalents may be made without departing from the true scope of the invention. It is accordingly intended, in the appended claims, to cover all such changes, equivalents and proper substitutes as fairly fall within the true scope of the invention and outside the scope of the prior art. Such a construction of the claims is asked as will best protect the true invention and afford the inventor and his assignees the benefit of a lawful and proper range of equivalents commensurate with the state of the art and this contribution thereto.

Having thus described my invention, I claim:

In a wave signal receiving system for signals within the short wave broadcast band extending from 9.45 to 11.9 megacycles and the standard frequency modulation broadcast band extending from 88 to 108 megacycles, the combination of a dipole antenna, a high-frequency transformer having a center-tapped primary and a secondary, said primary being connected to said dipole, means for resonating said primary and said secondary at the center of the upper band, whereby said transformer and said means comprise a double-tuned acceptor network for the upper band, a low-frequency transformer having a primary and a secondary, a capacitor for resonating the low-frequency primary at 10.7 megacycles, means for connecting said capacitor and the primary of said low-frequency transformer in series between the center tap on said high-frequency primary and ground, means for resonating the secondary of the low-frequency transformer at 10.7 megacycles, whereby said low-frequency transformer and said means comprise an acceptor network for the lower band, a frequency changing circuit for converting upper band signals into intermediate frequency signals of 10.7 megacycles, and switching means for selectively coupling either of said acceptor circuits to said frequency changing circuit, said low-frequency transformer and capacitor providing a rejector circuit for said intermediate frequency signals by grounding the center tap of the high frequency primary during reception of upper-band signals.

JEFFREY S. COHEN.

(References on following page)

REFERENCES CITED

The following references are of record in the file of this patent:

UNITED STATES PATENTS

| Number | Name | Date |
|---|---|---|
| 2,062,956 | Albright | Dec. 1, 1936 |
| 2,092,709 | Wheeler | Sept. 7, 1937 |
| 2,115,655 | Thompson | Apr. 26, 1938 |
| 2,131,976 | Schaper | Oct. 4, 1938 |
| 2,143,159 | Lundhal | Jan. 10, 1939 |
| 2,268,664 | Landon | Jan. 6, 1942 |
| 2,295,383 | Carlson | Sept. 8, 1942 |
| 2,295,408 | Koch | Sept. 8, 1942 |
| 2,441,028 | Matthews | May 4, 1948 |

FOREIGN PATENTS

| Number | Country | Date |
|---|---|---|
| 639,225 | France | Mar. 6, 1928 |